United States Patent
Takahashi (10) Patent No.: US 8,208,826 B2
(45) Date of Patent: Jun. 26, 2012

(54) IMAGE FORMING DEVICE PROVIDED WITH SENSOR AND MOVABLE SHUTTER

(75) Inventor: Osamu Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 418 days.

(21) Appl. No.: 12/561,997

(22) Filed: Sep. 17, 2009

(65) Prior Publication Data

US 2010/0079740 A1    Apr. 1, 2010

(30) Foreign Application Priority Data

Sep. 30, 2008    (JP) .................................. 2008-254037

(51) Int. Cl.
 *G03G 15/00*    (2006.01)
(52) U.S. Cl. ............................................ 399/74; 399/49
(58) Field of Classification Search .................... 399/49, 399/74
 See application file for complete search history.

(56) References Cited

U.S. PATENT DOCUMENTS

| | | | |
|---|---|---|---|
| 5,270,784 A * | 12/1993 | Nakane et al. | ................... 399/49 |
| 5,625,857 A | 4/1997 | Shimada et al. | |
| 2008/0019721 A1 | 1/2008 | Okano | |
| 2008/0145089 A1 * | 6/2008 | Takahashi | ....................... 399/74 |
| 2009/0154945 A1 * | 6/2009 | Tomita et al. | ................... 399/49 |
| 2009/0169233 A1 * | 7/2009 | Hayakawa | ....................... 399/74 |
| 2010/0014878 A1 * | 1/2010 | Tomita | ............................ 399/49 |

FOREIGN PATENT DOCUMENTS

| | | |
|---|---|---|
| JP | H01-257863 A | 10/1989 |
| JP | H07-225501 A | 8/1995 |
| JP | H09-034312 A | 2/1997 |
| JP | H11-015253 A | 1/1999 |
| JP | 2001-108618 A | 4/2001 |
| JP | 2002-328571 A | 11/2002 |
| JP | 2005-004122 A | 1/2005 |
| JP | 2008-026704 A | 2/2008 |

* cited by examiner

*Primary Examiner* — David Gray
*Assistant Examiner* — G. M. Hyder
(74) *Attorney, Agent, or Firm* — Baker Botts L.L.P.

(57) ABSTRACT

An image forming device has a conveying member, a light source, a photo-sensor, a shutter member, a shutter driving unit, a reflecting member and a judging member. The shutter member located between the photo-sensor and the conveying member is moved between a close position and an open position. The reflecting member provided on shutter member reflects light emitted by the light source when the shutter member entirely or partially shields the light emitted by the light source and directed toward the conveying member, and an intensity of light reflected by the reflecting member and detected by the photo-sensor varying depending on a position of the shutter member. The judging member judges whether the shutter member is located at the close position or the open position and whether the conveying member is present or absent based on the intensity of the light detected by the photo-sensor.

10 Claims, 10 Drawing Sheets

IMAGE FORMING DEVICE PROVIDED WITH SENSOR AND MOVABLE SHUTTER

CROSS-REFERENCE TO RELATED APPLICATION

This application claims priority under 35 U.S.C. §119 from Japanese Patent Application No. 2008-254037 filed on Sep. 30, 2008. The entire subject matter of the application is incorporated herein by reference.

BACKGROUND

1. Technical Field

Aspects of the invention relate to a so-called tandem type color image forming device, and in particular, relate to the image forming device provided with a sensor, which optically detects marks formed on a conveying member for a correction of a color registration error.

2. Related Art

Conventionally, a so-called color image forming device is configured such that, for correcting the color registration error, marks corresponding to the color components used for forming an image are formed on a conveying member (e.g., a sheet feed belt) and the positions of the marks are detected using a sensor. Specifically, the marks are detected such that a light source (e.g., an LED) is driven to emit light toward the conveying member and a photosensor (e.g., a photo-transistor) receives the light reflected by the conveying member on which the marks are formed.

In the image forming device of the above-described type, it is proposed that a shutter is provided between the conveying member and the photosensor to prevent a stain of the photosensor due to toner or some particles, which may be moved from the conveying member to the photosensor. In the image forming device employing the shutter as described above, it is also proposed that a status of the shutter, i.e., whether the shutter is opened or closed, should also be detected based on an amount of the light received with the photosensor. When the shutter does not open normally, the marks are not detected properly. Therefore, when the amount of the light the photosensor receives is extremely low, the image forming device judges that the shutter stays closed although the shutter is driven to open.

SUMMARY

However, there remains a problem in the conventional configuration as follows. Namely, when a user of the image forming device forgets to mount the conveying member in position, i.e., the conveying member is unmounted, it is also detected that the shutter malfunctions even if the shutter functions correctly because the light received by the photosensor is extremely low as the light is not reflected by the conveying member.

Aspects of the invention provide an improved image forming device in which both the malfunction of the shutter and the lack of the conveying member are distinctly detected respectively.

According to aspects of the present invention, there is provided an image forming device to form an image on a print sheet. The image forming device has a conveying member, a light source, a photo-sensor, a shutter member, a shutter driving unit, a reflecting member and a judging member. The conveying member conveys the print sheet. The light source irradiates light toward the conveying member. The photo-sensor detects light irradiated from the light source and reflected by the conveying member. The shutter member is movably disposed between a close position at which the shutter member shields the light irradiated from the light source and directed toward the conveying member, and an open position at which the shutter member does not shield the light directed from the light source toward the conveying member, and the light incident on the conveying member is reflected and directed to the photo-sensor. The shutter driving unit moves the shutter member between the close position and the open position. The reflecting member is provided on a photo-sensor side of the shutter member, and the reflecting member reflects light emitted by the light source when the shutter member entirely or partially shields the light emitted by the light source, and an intensity of light reflected by the reflecting member and detected by the photo-sensor varies depending on a position of the shutter member. The judging member judges (1) whether the shutter member is located at the close position or the open position based on variation of the intensity of the light detected by the photo-sensor when the shutter member is being driven to move by the shutter driving unit, and (2) whether the conveying member is present or absent based on the intensity of the light detected by the photo-sensor when the judging member judges that the shutter member is located at the open position.

DETAILED DESCRIPTION

Hereinafter, a laser beam printer will be described according to aspects of the present invention, referring to the accompany drawings. It is noted that, although a description will be made with respect to a laser beam printer according to aspects of invention, various modifications and changes may be made by those skilled in this art without departing from the scope of the invention.

Figure 1:
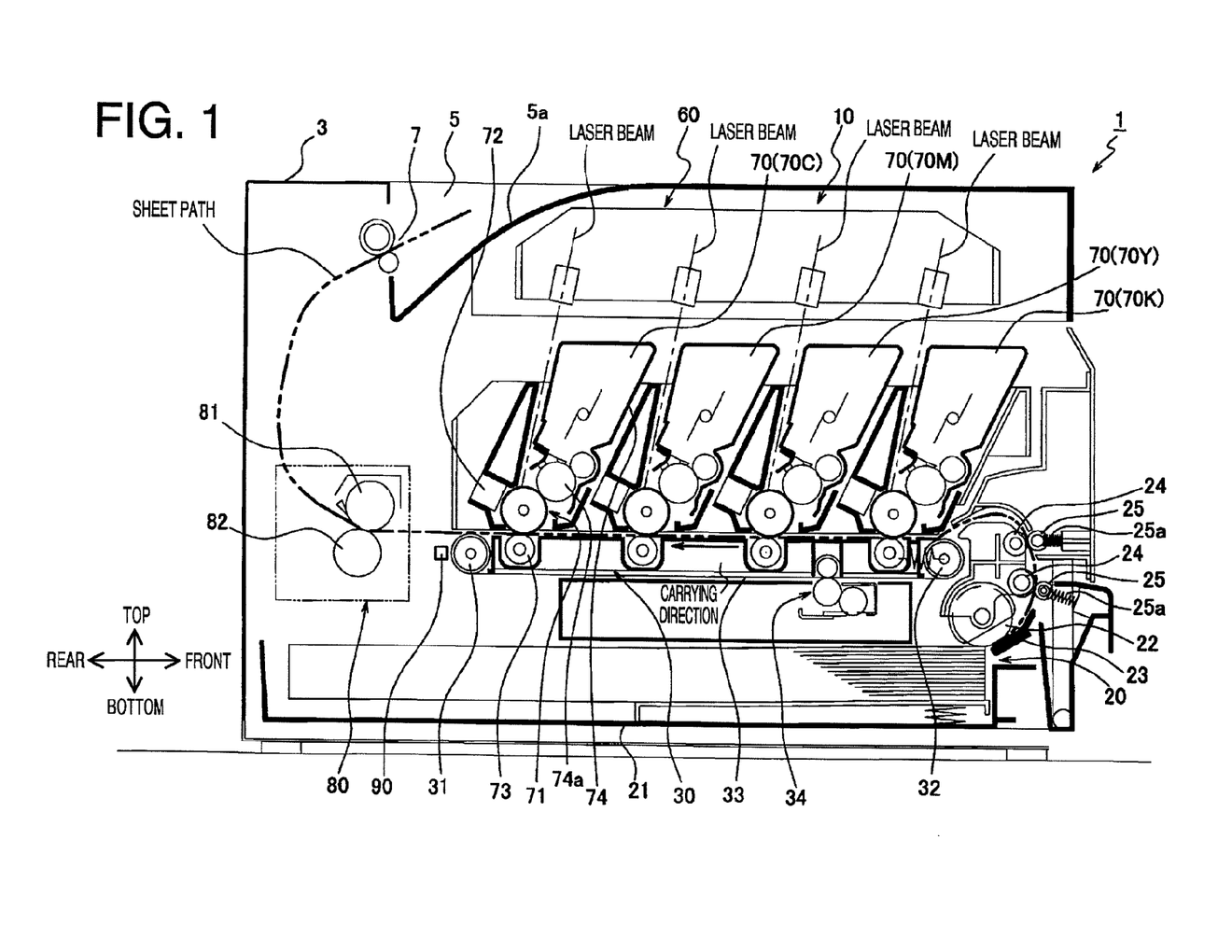
FIG. 1 is a cross-sectional side view showing a configuration of a laser beam printer according to an exemplary embodiment of the present invention.

The laser beam printer 1 is placed, when in use, as shown in FIG. 1. In the following description, a top side (or direction), a bottom side (or direction), a rear side (or direction) and a front side (or direction) of the printer 1 are defined as shown in FIG. 1. The laser beam printer 1 has a substantially box-shaped housing 3. On the top side (surface) of the housing 3, a sheet tray 5 is formed. Print sheets (e.g., paper, OHP sheets, etc.), on which images are formed and discharged from the printer 1, are stacked on the sheet tray 5.

As shown in FIG. 1, the sheet tray 5 has an inclined surface 5a which is configured to be gradually lowered from the front side portion toward the rear side portion thereof. Above the rear side end of the inclined surface 5a, a discharging section 7 is defined, from which the print sheets are discharged after the print process.

A frame member (not shown in FIG. 1) made of metal or resins is provided in the housing 3. As described later, a process cartridge 70, a fuser unit 80 etc., are detachably mounted onto the frame member provided in the housing 3.

Print sheets are fed from a feeder section 20 to an image forming section 10, where images are formed on the print sheets. A feeding mechanism 30 is provided for feeding each print sheet along a sheet feed path so that the print sheet subsequently face four process cartridges 70K, 70Y, 70M and 70C of the image forming section 10, which respectively form black, yellow, magenta and cyan components.

A registration sensor 90 is for detecting well-known registration marks which are formed on a sheet feed belt 33. According to the embodiment, the sheet feed belt 33 serves as an image carrier. The marks formed on the sheet feed belt 33 are used for adjusting image formation position of each color component formed by the process cartridges 70K, 70Y, 70M and 70C. The print sheet on which the image is formed at the image forming section 10 is fed upward, discharged from the discharging section 7, and stacked on the sheet tray 5a. It is noted that a sheet path of the print sheet is shown by two-dotted line in FIG. 1.

The feeder section 20 has a sheet feeding tray 21, a sheet feeding roller 22 and a separation pad 23. The sheet feeding tray 21 accommodates a stack of print sheets and is mounted at a lower part of the housing 3 as shown in FIG. 1. The sheet feeding roller 22 is arranged to oppose to the front end side portion of the uppermost sheet of the print sheets accommodated in the sheet feeding tray 21 and feeds the print sheets stacked in the sheet feeding tray 21, one by one, to the image forming section 10. The separation pad 23 is arranged in the vicinity of the front side end of the print sheets accommodated in the sheet feeding tray 21, opposing to the sheet feeding roller 22 to apply a predetermined resistance to the print sheets so that the print sheets are separated and fed one by one.

The print sheet drawn from the sheet feeding tray 21 is fed to U-turn at a front end portion inside the housing 3 and directed toward the image forming section 10 which is disposed at a central portion inside the housing 3. In order to apply a feeding force at a portion where the print sheet U-turns, feeding rollers 24 are provided.

Pressure rollers 25 are provided at portions opposite to the feeding rollers 24 with the print sheet (sheet path) sandwiched therebetween. The pressure rollers 25 are biased toward the corresponding feeding rollers 24 by a biasing mechanism such as coil-springs 25a.

The feeding mechanism 30 has a drive roller 31 which rotates in association with an image forming operation of the image forming section 10, a driven roller 32 disposed at a place spaced from the drive roller 31, and the sheet feed belt 33 is wound around both the drive roller 31 and the driven roller 32. The driven roller 32 is driven to rotate as the drive roller 31 rotates and the sheet feed belt 33 moves. The print sheet fed from the sheet feeding tray 21 is further fed to the four process cartridges 70K, 70Y, 70M and 70C sequentially as the sheet feed belt 33 rotates with carrying the print sheet thereon. It is noted that the feeding mechanism 30 is configured as one units, and the feeding mechanism 30 is exchangeable by opening a top cover of the housing 3. Below the sheet feed belt 33, a belt cleaner 34 is disposed to erase the registration marks formed on a surface of the sheet feed belt 33.

The image forming section 10 includes a scanner unit 60, process cartridges 70 and a fuser unit 80. The image forming portion 10 is of a so-called direct tandem type for color image formation.

In the exemplary embodiment, the four process cartridges 70K, 70Y, 70M and 70C for forming black, yellow, magenta and cyan toner images are arranged in this order from the upstream of sheet feed direction. It is noted that the four process cartridges 70K, 70Y, 70M and 70C are only different by the color of the toner, and have the same structure. Hereinafter, any one of the four process cartridges 70K, 70Y, 70M and 70C will be referred to as the process cartridge 70 for brevity.

The scanner unit 60 is disposed in the upper part inside the housing 3, and forms an electrostatic latent image on a surface of photoconductor drum 71 provided in the process cartridge 70. As is well-known, the scanner unit 60 has a laser source, a polygon mirror, an fθ lens, a reflecting mirror, and so on.

Each process cartridge 70 is detachably disposed below the scanner unit 60 in the housing 3. Each process cartridge 70 has a photoconductor drum 71, an electrifier 72 and a developing cartridge 74 provided with a developing roller 74a. As shown in FIG. 1, the photoconductor drum 71 of each of the process cartridges 70 is opposed to respective one of four transfer rollers 73 provided in the feeding mechanism 30, and the portions where the process cartridges 70 face the transfer rollers 73 are image transfer sections for respective color components.

The fuser unit 80 is disposed at the downstream, in the sheet feed direction, of the photoconductor drum 71 of the process cartridge 70C, and fixes the toner images transferred by the four process cartridges 70 onto the print sheet by applying heat to fuse the toner images. Specifically, the fuser unit 80 has a heat roller 81, which is disposed on the image-formation side of the print sheet, to apply a sheet feeding force as well as the heat, a pressure roller 82, which is disposed on the opposite side of the heat roller 81 with respect to the print sheet, to apply a pressing force to the print sheet nipped between the heat roller 81 and the pressure roller.

In the image forming section 10, an image is formed on the print sheet as follows. The surface of the rotating photoconductor drum 71 is positively and uniformly charged with the electrifier 72, and then the charged surface of the photoconductor drum 71 is exposed to a high-speed scanning laser beam emitted from the scanner unit 60 and modulated based on image data. The electric potential of portions which are exposed to the laser beam becomes lower than that of the portions unexposed to the laser beam, thereby an electrostatic latent image corresponding to the image, which is to be formed on the print sheet, is formed on the photoconductor drum 71.

Next, by applying a developing bias to the developing roller 74a, which is rotating, nonmagnetic one-component toner, which is positively charged and carried on the developing roller 74a, is transferred to the electrostatic latent image formed on the surface of the photoconductor drum 71 as the toner contact the latent image, which corresponds to the portions where the electric potential is lowered in comparison with the other portions of the uniformly charged surface of the photoconductor drum 71. With this developing process, the electrostatic latent image is developed, i.e., a toner image is formed on the surface of the photoconductor drum 71.

Then, the toner image carried on the surface of the photoconductor drum 71 is transferred to the print sheet as a transfer bias is applied to the transfer roller 73. The print sheet bearing the toner image is fed to the fuser unit 80, where the toner image is fixed onto the print sheet and the image forming (printing) operation is completed.

As shown in FIGS. 2A-2C 3A and 3B, the registration sensor 90 has a sensor LED 93 for emitting infrared light toward the sheet feed belt 33, and a photo-transistor 91 for detecting the infrared light reflected by the sheet feed belt 33.

Figure 2A:
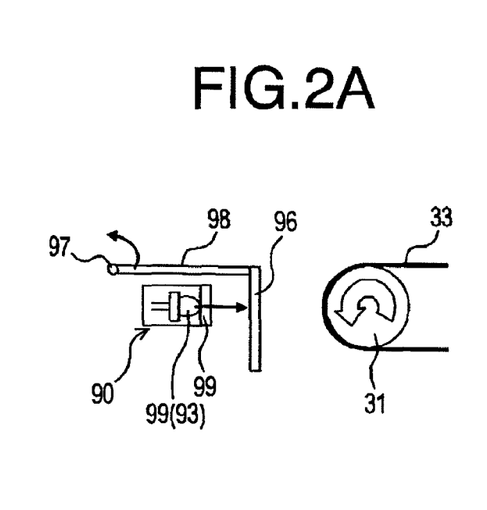
FIGS. 2A, 2B and 2C are cross-sectional side views showing configurations and operations of a registration sensor of the laser beam printer according to the exemplary embodiment of the present invention.
Figure 2B:
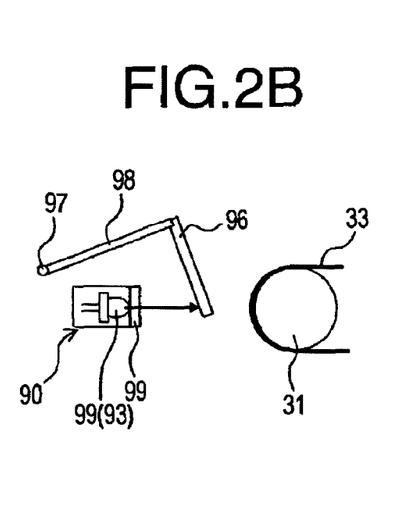
Figure 2C:
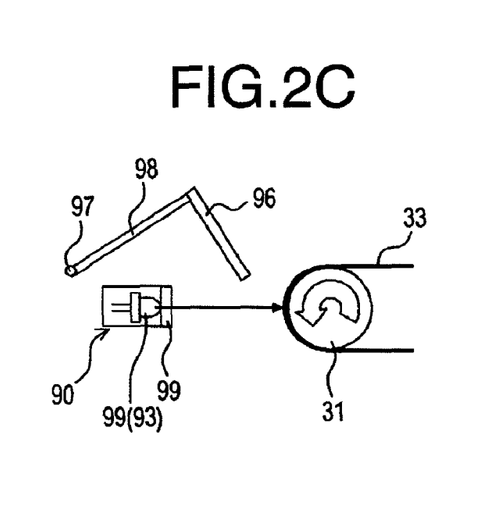

Between the registration sensor 90 and the sheet feed belt 33, a planar shutter 96 is provided (see FIGS. 2A-2C). The shutter 96 is driven by a solenoid 95 (see FIG. 6) to open/close the registration sensor 90 (i.e., the shutter 96 being locatable at an open position where the registration sensor 90 is exposed and at a close position where the registration sensor 90 is covered with the shutter 96). When the shutter 96 is located at the close position, the toner and/or paper particles on the sheet feed belt 33 are prevented from being transferred to the registration sensor 90. As shown in FIG. 2A, the shutter 96 is fixed to the front end of a lever 98 approximately perpendicular thereto. The lever 98 is configured to rotate about a shaft 97, which extends in a right and left direction (i.e., a direction perpendicular to a plane of FIG. 2A) and is provided on the upper rear side with respect to the registration sensor 90. The shutter 96 is driven to rotate about the shaft 97, i.e., the shutter 96 is moved approximately in a top and bottom direction (FIG. 1), between the close position (see FIG. 2A) and the open position (see FIG. 2C) by the solenoid 95. When located at the close position (see FIG. 2A), the shutter 96 extends approximately perpendicular to a light path between the registration sensor 90 and a position of the sheet feed belt 33 where the infrared light is incident and reflected. At the close position, the shutter 96 shields the light emitted from the sensor LED 93. When located at the open position (see FIG. 2C), the shutter 96 does not shield the light directed from the sensor LED 93 toward the sheet feed belt 33.

As the shutter 96 travels between the open position and close position, a distance, approximately along the optical path, between the registration sensor 90 (the photo-transistor 91 and the sensor LED 93) and a sensor side surface of the shutter 96 varies. In the exemplary embodiment, the status of shutter 96 is detected by providing an aperture plate 99 disposed in front of the photo-transistor 91 and the sensor LED 93 as described below.

Figure 3A:
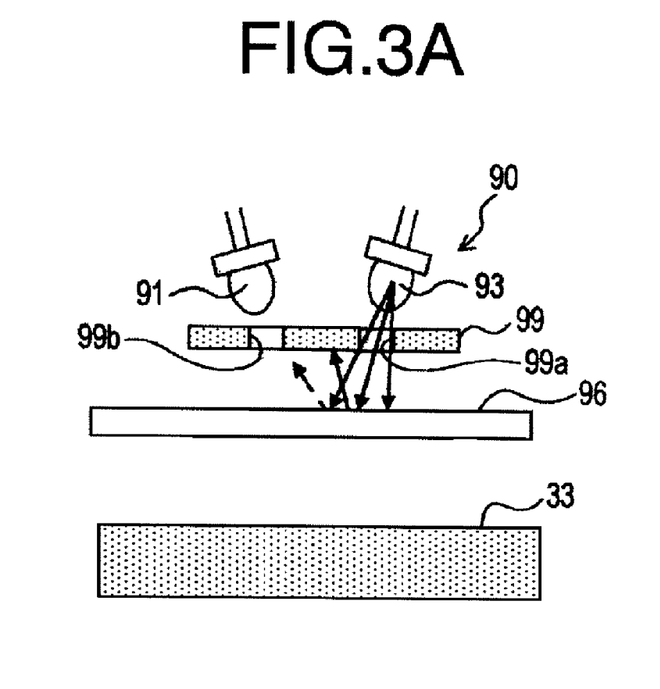
FIGS. 3A and 3B are top views showing configurations and operations of the registration sensor of the laser beam printer according to the exemplary embodiment of the present invention.
Figure 3B:
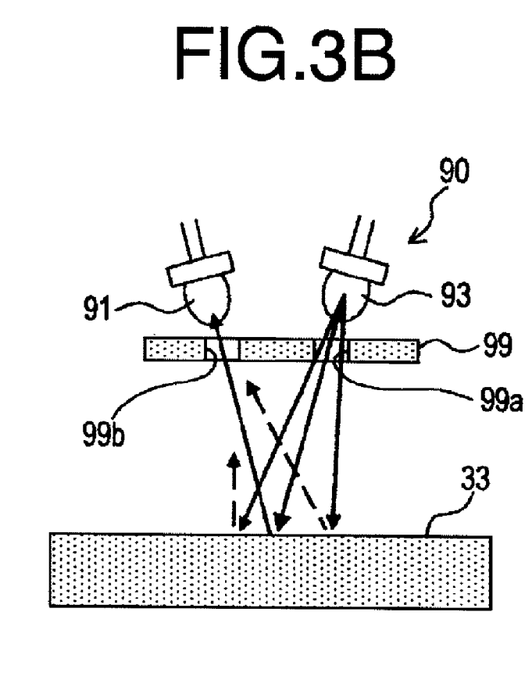

As shown in FIG. 3B, the aperture plate 99 has two apertures 99a and 99b, which are arranged such that, the infrared light emitted from the sensor LED 93 passed through the aperture 99a is reflected by the sheet feed belt 33, and the specularly reflected light passes through the aperture 99b and is incident on the photo-transistor 91. Note that, in FIGS. 3A and 3B, a specular reflection component of the infrared light reflected by the sheet feed belt 33 is indicated by solid lines, and a diffuse reflection component of the light reflected by the sheet feed belt 33 is indicated by broken lines. As shown in FIG. 3B, part of the light diffusely reflected by the sheet feed belt 33 also passes through the aperture 99b and is incident on the photo-transistor 91.

In addition, as shown in FIG. 3A, the apertures 99a and 99b are formed such that the infrared light which passes through the aperture 99a and then specularly or diffusely reflected by the shutter 96 is hardly incident on the photo-transistor 91 via the aperture 99b when the shutter 96 is in the close position. When shutter 96 is moved and the distance between the registration sensor 90 (the photo-transistor 91 and the sensor LED 93) and the shutter 96 is increased (i.e., when the position of the shutter 96 is changed from the status shown in FIG. 2A or 3A to the status shown in FIG. 2B), part of the light diffusely reflected by the inner surface of the shutter 96 is incident on the photo-transistor 91.

Figure 4:
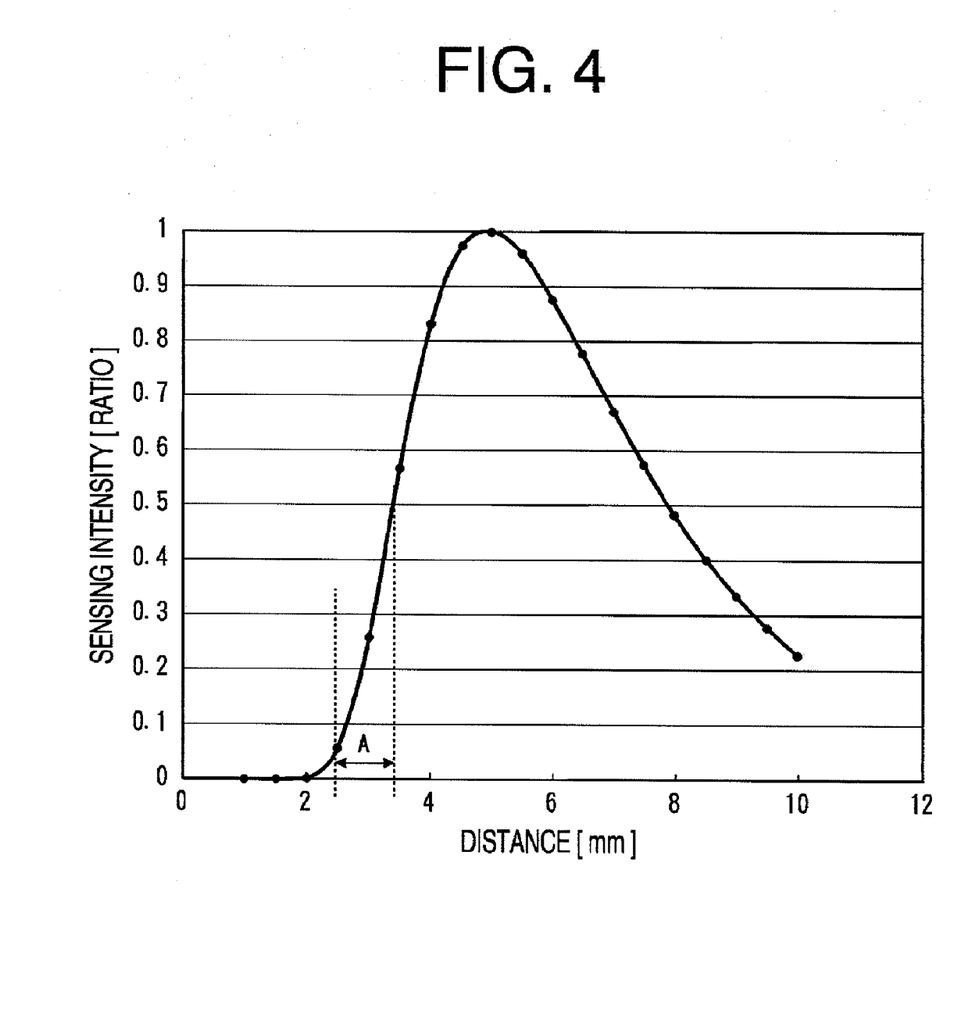
FIG. 4 is a graph showing an example of the characteristic of the registration sensor, which represents the light-receiving intensity of the registration sensor corresponding to the distance to the shutter (i.e., distance-intensity characteristic) when normalized, according to the exemplary embodiment of the present invention.

As shown in FIG. 4, when the distance from the registration sensor 90 is 5 mm (millimeters), the specularly reflected light incident on the photo-transistor 91 has the largest intensity. This distance, i.e., 5 mm, is set as the distance between the registration sensor 90 (the photo-transistor 91 and the sensor LED 93) and the sheet feed belt 33. The variation of the distance between the sensor LED 93 and the position on the inner surface of the shutter 96 when the shutter 96 moved from the close position (shown in FIG. 2A) to a position at which the infrared light is incident on the edge of the inner surface of the shutter 96 (shown in FIG. 2B) is indicated by allow A in FIG. 4. In the exemplary embodiment, the variation of the intensity of the light received by the photo-transistor 91 corresponding to the range A is utilized to detect the malfunction of the shutter 96.

Figure 5A:
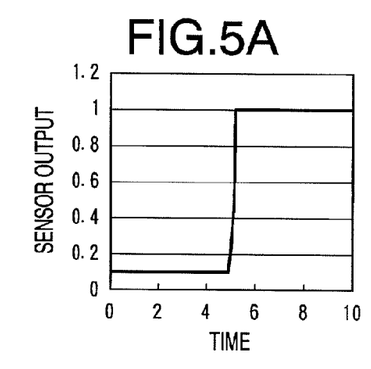
FIGS. 5A, 5B, 5C, 5D and 5E are graphs schematically showing outputs of the registration sensor according to the exemplary embodiment of the present invention.
Figure 5B:
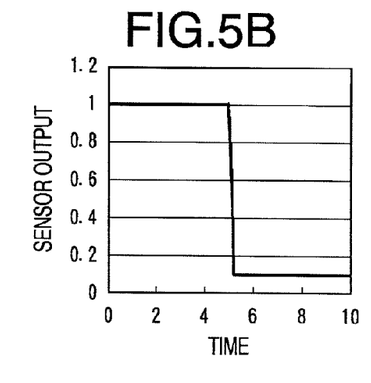

As shown in FIG. 5A, when the shutter 96 is located at the close position, the sensor output is extremely small, but when the infrared light is incident on the edge of the shutter 96 at about TIME 5 in FIG. 5A, the sensor output rises up rapidly. As the shutter 96 is further moved and when the infrared light is incident on and reflected by the sheet feed belt 33, the sensor output further increases. When the shutter 96 is moved from the open position to the close position, as shown in FIG. 5B, the change of the sensor output shows reversed characteristic with respect to that of FIG. 5A.

Figure 5C:
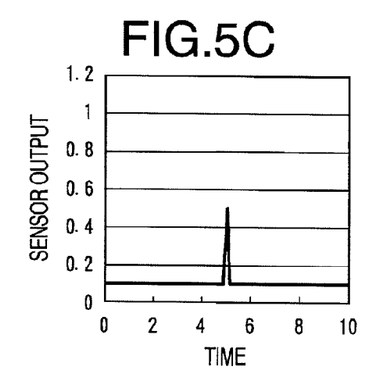

In contrast, when the shutter 96 is moved if the sheet feed belt 33 is removed together with the conveying mechanism 30, the light is not reflected by the sheet feed belt 33 and thus the light specularly reflected by the sheet feed belt 33 is not incident on the photo-transistor 91 when the shutter 96 is located at the open position. Thus, as shown in FIG. 5C, a sharp peak pulse of the sensor output is observed when the infrared light is irradiated to the edge of shutter 96, but the sensor output remains small at the other time points. It is noted that, if the sheet feed belt 33 is unmounted, the variation of the sensor output when the shutter 96 is moved from the open position to the close position and that when the shutter 96 is moved from the close position to the open position are approximately the same.

Figure 5D:
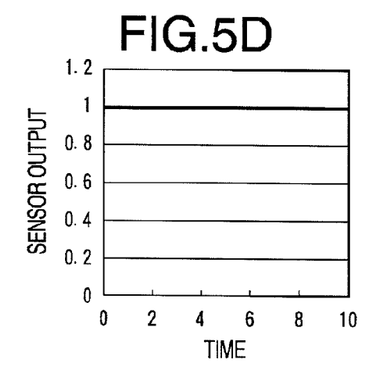
Figure 5E:
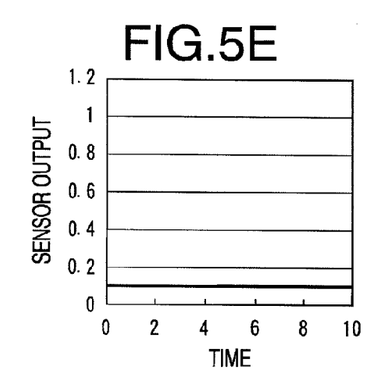

If the shutter 96 remains opened due to malfunction of the shutter 96 when the sheet feed belt 33 is mounted, the sensor output is maintained to be large as shown in FIG. 5D. If the shutter 96 remains closed due to malfunction thereof when the sheet feed belt 33 is mounted, the sensor output is maintained to be small as shown in FIG. 5E. Thus, in the exemplary embodiment, by utilizing the variation of the sensor output, the malfunction of the shutter 96 and the presence or absence of the sheet feed belt 33 are distinctly detected.

Figure 6:
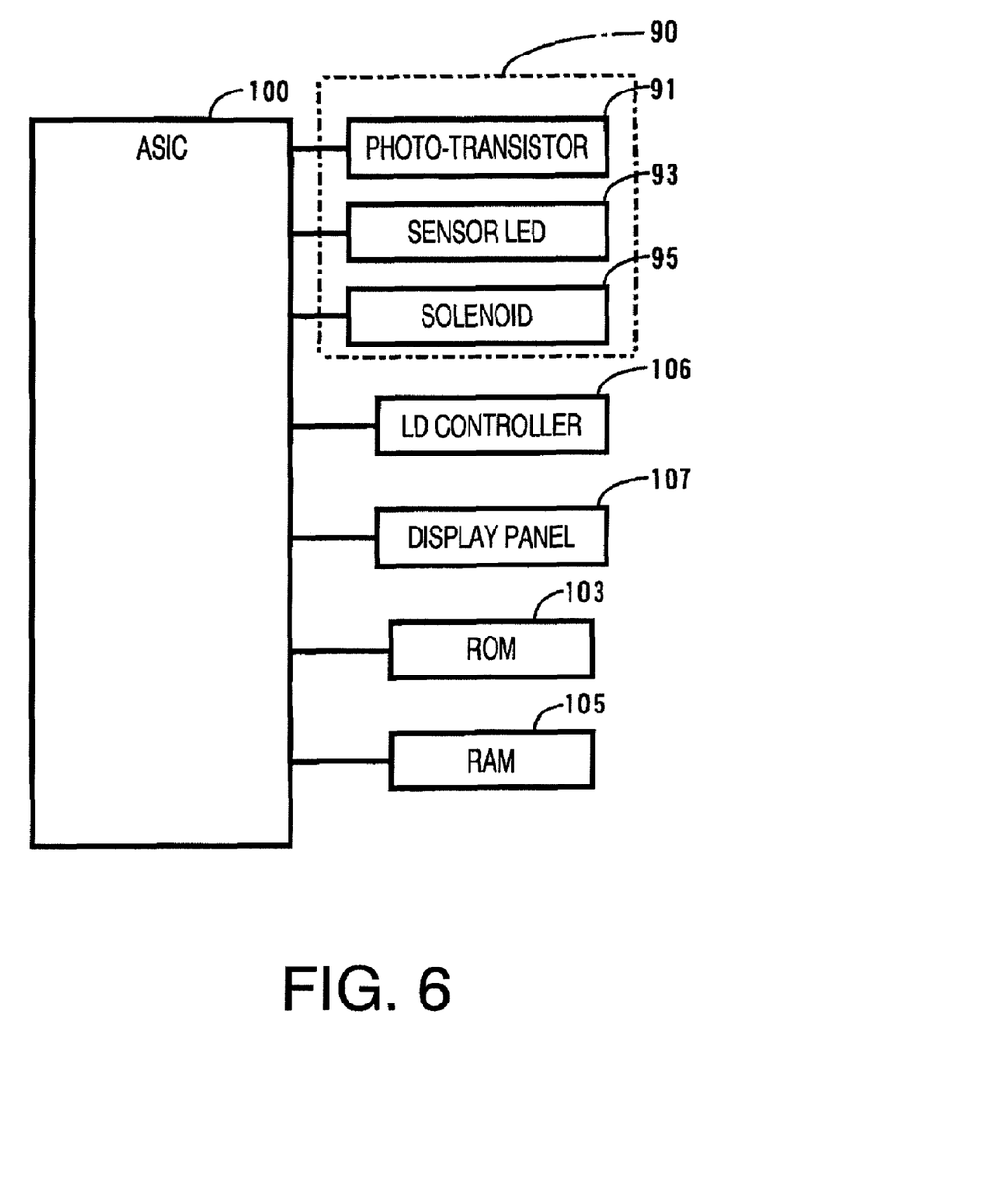
FIG. 6 is a block diagram showing a configuration of a controller of the laser beam printer according to the exemplary embodiment of the present invention.

As shown in FIG. 6, the photo-transistor 91, the sensor LED 93, and the solenoid 95 for driving the shutter 96 are connected to an ASIC (application specific integrated circuit) 100 to perform various processes. Furthermore, a ROM 103 storing various programs, a RAM 105 serving as a work area for temporarily storing various pieces of data, an LD controller 106 for controlling the laser sources corresponding to respective color components, and a display panel 107 provided on the surface of the housing 3 are connected to the ASIC 100.

At a predetermined timing (e.g., when the laser beam printer 1 is powered ON), a color registration error correction process (see FIG. 7) is performed. In the color registration error correction process, the registration marks are formed on the sheet feed belt 33 and the formed registration marks are detected using the registration sensor 90.

Figure 7:
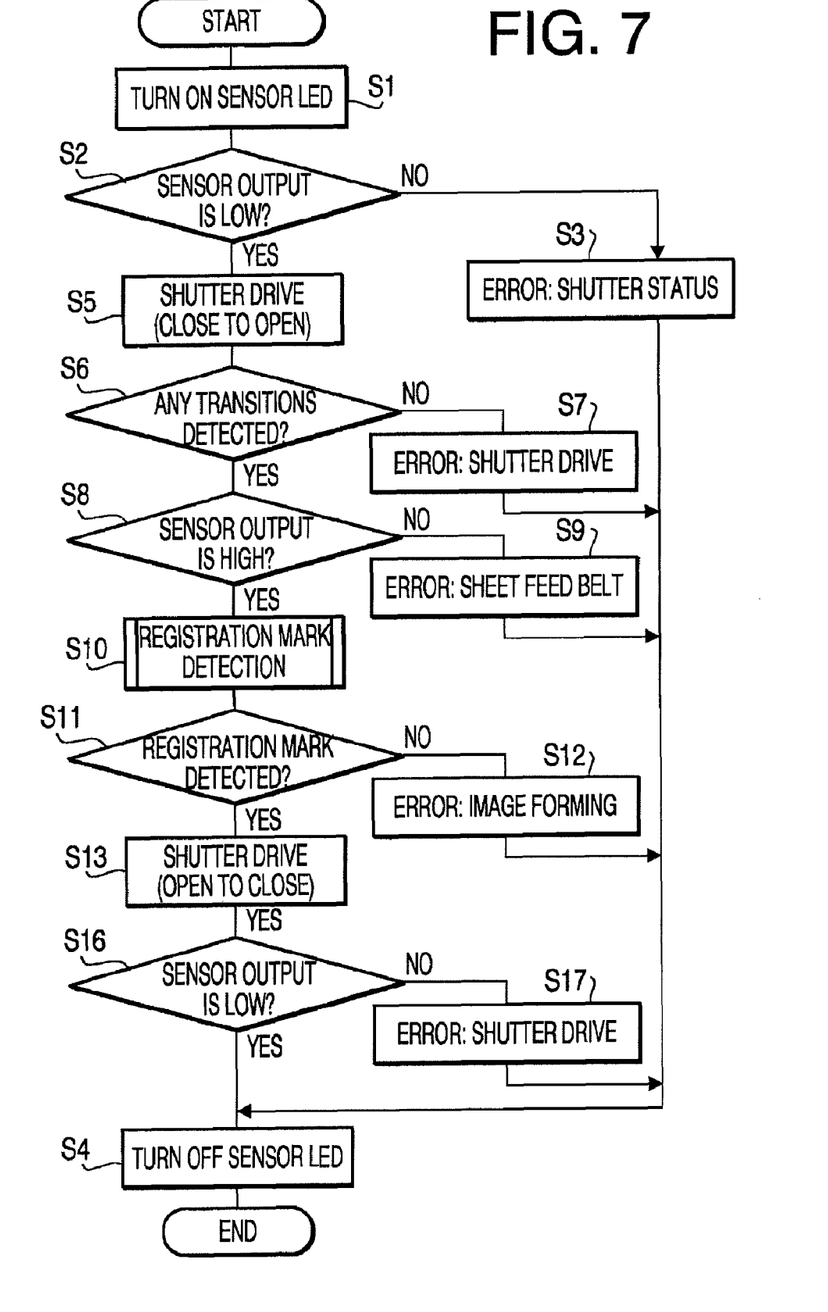
FIG. 7 is a flowchart illustrating a color registration error correction process performed by the controller of the laser beam printer according to the exemplary embodiment of the present invention.

As shown in FIG. 7, the color registration error correction process is started, firstly, the sensor LED 93 is turned on (S1). Then, the ASIC 100 judges whether the sensor output is L (Low) in S2. In this exemplary embodiment, the ASIC 100 judges that the sensor output is L when a ratio of the light-receiving intensity shown in FIG. 5 is 0.4 or lower. It should be noted that the sensor output is L when the registration error correction process is started (i.e., at this stage, the shutter 96 should be located at the close position). When the sensor output is not L (S2: NO), the ASIC 100 determines that the shutter 96 is not located at the close position. Thus, in such a case (i.e., the sensor output is not L), an error handling process corresponding to the malfunction of the shutter 96 is performed in S3. Then, the sensor LED 93 is turned off in S4, and the color registration error correction process is terminated. According to this exemplary embodiment, in S3, the malfunction of the shutter is notified to a user by indicating an error message on the display panel 107, and the ASIC 100 drives the solenoid 95 to move the shutter 96 to the close position.

If the sensor output level is L (S2: YES), the ASIC 100 drives the solenoid 95 such that the shutter 96 is moved from the close position toward the open position (S5). In S6, the ASIC 100 judges whether a rising edge of the sensor output, which occurs when the infrared light is incident on the edge of the shutter 96, is detected during the shutter movement which is initiated in S5. Hereinafter, the detection of the rising edge of the sensor output corresponding to the passage of the edge portion of the shutter 96 in a light path of the infrared light from the sensor LED 93 toward the sheet feed belt 33 will be referred to as a detection of the edge, or an edge detection. If the edge has not been detected (S6: NO), the ASIC 100 judges that the shutter 96 remains in the close position although the shutter 96 is driven to be opened. In such a case, an error handling process corresponding to the malfunction of the shutter 96 is performed in S7, and the process returns to S4. In the error handling process in S7, the ASIC 100 notifies the malfunction of the shutter by indicating an error message on the display panel 107, and controls the solenoid 95 such that the shutter 96 is moved toward the close position.

When the ASIC 100 judges that the edge is detected (S6: YES), it further judges whether the sensor output level is H (High) (i.e., a ratio of the light-receiving intensity is 0.4 or more in FIG. 5) in S8. If the sensor output level does not reach H (S8: NO) after the edge detection in S6, the ASIC 100 determines that the sheet feed belt 33 is not mounted in the image forming device 1. In such a case, an error handling process corresponding to a case where the sheet feed belt 33 is not mounted is performed in S9, and the process returns to S4. Note that, in the error handling process in S9, the ASIC 100 notifies the user that the sheet feed belt 33 is not mounted by indicating an error message on the display panel 107, and drives the solenoid 95 such that the shutter 96 moves to the close position.

When the ASIC 100 determines that the sensor output level is H (S8: YES), the process proceeds to a registration mark detection process is performed (S10). The registration mark detection process is a well-known process which detects the registration marks, which are formed on the sheet feed belt 33 by the image forming unit 10 controlled by LD controller 106, using the registration sensor 90. In S11, the ASIC 100 judges whether the detection of the registration marks is successful. When the detection of the registration mark is not successful (S11: NO), an error handling process corresponding to a malfunction in an image formation is performed in S12, and the process returns to S4. Note that, in the error handling process in S12, the ASIC 100 notifies the malfunction in the image formation by indicating an error message on the display panel 107, and drives the solenoid 95 such that the shutter 96 moves to the close position.

When the detection of the register marks is successful (S11: YES), the ASIC 100 drives the solenoid 95 such that the shutter 96 moves from the open position to the close position (S13). Then, in S13, and the ASIC 100 judges whether the sensor output level is L. If the sensor output level is not L (S16: NO), the ASIC 100 judges that the shutter 96 remains in the open position although the shutter 96 is driven to move to the close position. Thus, in that case, an error handling process corresponding to the malfunction of the shutter is performed in S17, and the process returns to S4 above-described. Note that, in the error handling process in S17, the ASIC 100 notifies the malfunction of the shutter by displaying an error message on the display panel 107, and drives the solenoid 95 to move the shutter 96 to the close position.

If the sensor output level is L (S16: YES), the process returns to S4 without executing an error handling process, the sensor LED 93 is turned off, and the process is terminated. As described above, according to the exemplary embodiment, the ASIC 100 can distinctly detect the malfunction of the shutter 96 and the presence or absence of the sheet feed belt 33 properly because the light reflected from the shutter 96 is incident on the photo-transistor 91 in mid-course when the shutter 96 is moved between the open position and the close position.

It is noted that the present invention is not limited to the configuration of the exemplary embodiment described above. Rather, it should be appreciated that the configuration can be modified in various ways without departing from the scope of the invention. For example, an edge portion of the shutter 96 for reflecting the infrared light emitted by the sensor LED 93 may be formed to be substantially perpendicular to the light path when the shutter 96 is located at a position shown in FIG. 2B so that the infrared light reflected by the surface directs to the photo-transistor 91 more directly.

According to the exemplary embodiment, a portion of the sensor side surface of the shutter 96, on which the infrared emitted by the sensor LED 93 is incident when the shutter 96 moves between the open position and the close position, is configured such that the light reflecting characteristic varies depending on the position of the shutter 96. Such a configuration can be achieved in various ways, not limited to that of the exemplary embodiment. One modification is shown in FIG. 8. Specifically, a shutter 96' shown in FIG. 8 is configured such that a first reflecting member 96a' having a higher reflectivity and a second reflecting member 96b' having lower reflectivity are adhered on the sensor side surface of the shutter 96'.

Figure 8A:
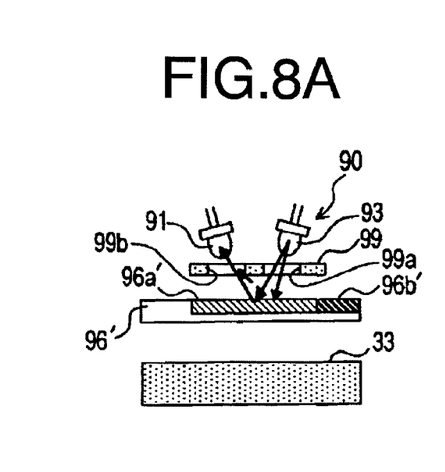
FIGS. 8A, 8B and 8C are top views showing configurations and operations of the registration sensor of the laser beam printer according to a modified embodiment of the present invention.
Figure 8B:
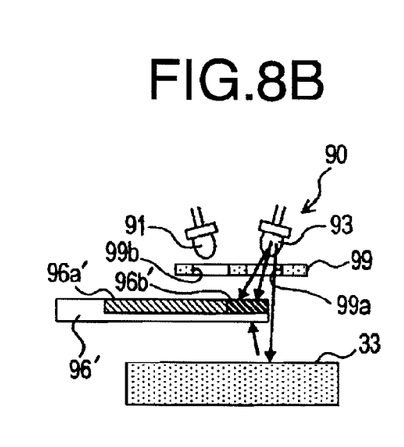
Figure 8C:
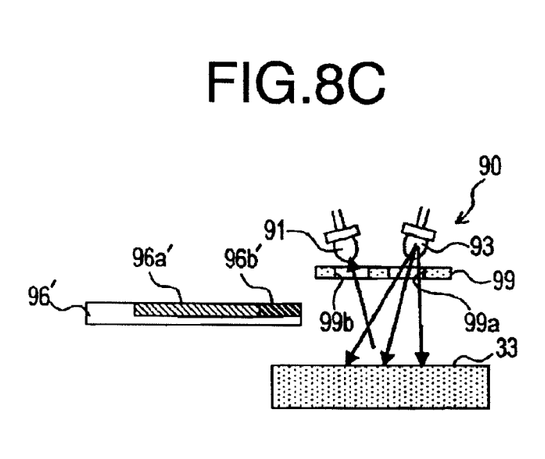

According to the modification, the shutter 96' is slid substantially perpendicular to the light path of the infrared light directed from the sensor LED 93 to the sheet feed belt 33, i.e., in a right and left direction (i.e., a direction parallel to a plane of FIG. 8). Namely, the shutter 96' moves between an open position at which the shutter 96' does not shield the infrared light directed from the sensor LED 93 to the sheet feed belt 33 (see FIG. 8C) and a close position at which the shutter 96' completely bocks the infrared light directed toward the sheet feed belt 33 (see FIG. 8A).

The first reflecting member 96a' is attached to a portion of the shutter 96' opposed to the photo-transistor 91 and the sensor LED 93 when the shutter 96' is located at the close position as shown in FIG. 8A, and the second reflecting member 96b' is attached to the edge portion of the shutter 96', next to the first reflecting member 96a', so that the infrared light is reflected by the second reflecting member 96b' and incident on the photo-transistor 91, as shown in FIG. 8B, in the mid-course of the movement of the shutter 96' between the open position (FIG. 8C) and the close position (FIG. 8A). Further, the apertures 99a and 99b are formed on the aperture plate 99 so that both the infrared light specularly reflected by the sheet feed belt 33 and the infrared light specularly reflected by the first reflecting member 96a' 8A are incident on the photo-transistor 91. It should be noted that the second reflecting member 96b' has low reflectivity and the specularly reflected light is incident on the photo-transistor 91 but hardly detected thereby since the intensity is too small.

Thus, according to this modification, when the shutter 96' is opened and closed, the output of the photo-transistor 91 varies as shown in FIGS. 9A to 9E which correspond to FIGS. 5A to 5E, respectively. That is, when the shutter 96' is opened and closed when the sheet feed belt 33 is mounted, the sensor output is H when the shutter 96' is located at the open position or the close position, while the sensor output is momentarily dropped to L when the infrared light is incident on the second reflecting member 96b'.

Figure 9A:
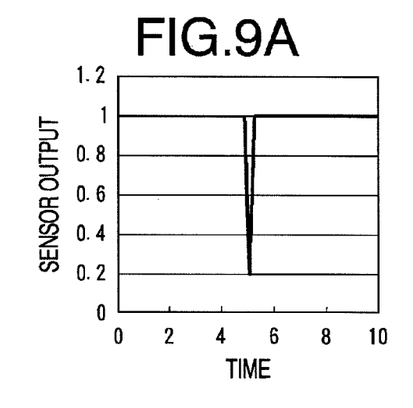
FIGS. 9A, 9B, 9C, 9D and 9E are graphs schematically showing outputs of the registration sensor according to the modified embodiment of the present invention.
Figure 9B:
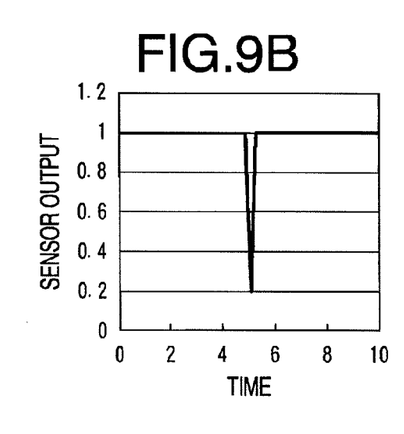
Figure 9C:
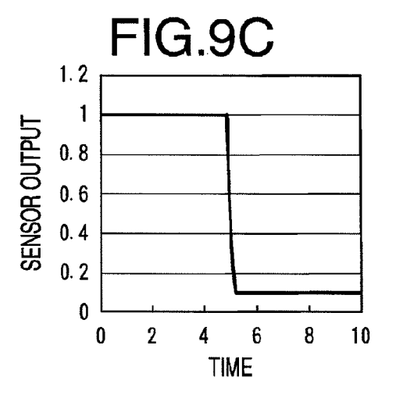
Figure 9D:
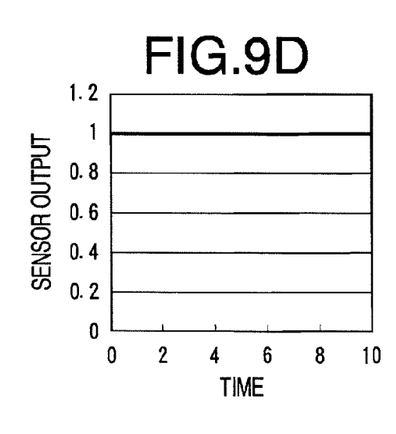
Figure 9E:
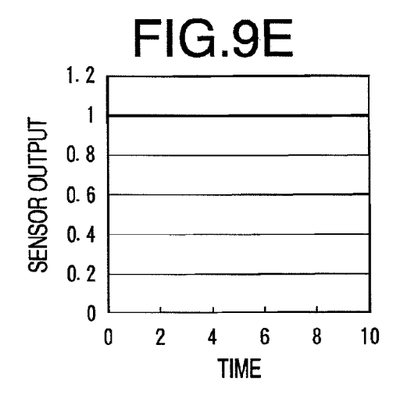

If the sheet feed belt 33 is not mounted, when the shutter 96' moves from the close position to the open position the sensor output level changes from H to L and remains in L level. If the sheet feed belt 33 is mounted and the shutter 96' remains in the open position or close position, even driven to move, due to the malfunction thereof, the sensor output level is maintained to be H as shown in FIG. 9D or FIG. 9E.

Thus, according to the modification, the ASIC 100 can also distinctly detect the malfunction of the shutter 96' and the presence or absence of the sheet feed belt 33.

Figure 10:
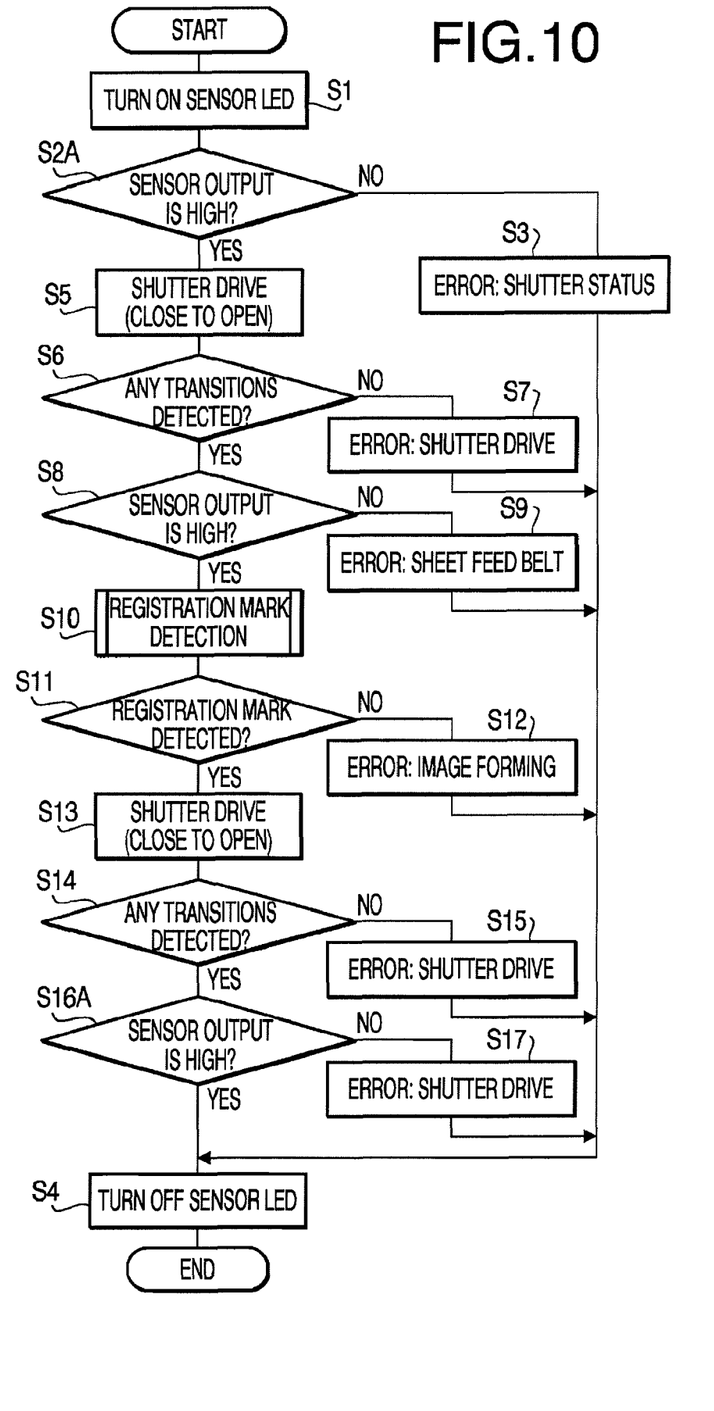
FIG. 10 is a flowchart illustrating a process performed by the controller of the laser beam printer according to the modified embodiment of the present invention.

A color registration error correction process according to the modification will be described with reference to FIG. 10. According to the modification, Steps S2 and S16 shown in FIG. 7 are replaced with S2A and S16A in FIG. 10. According to the modification, the sensor output level is H when the shutter 96' is located at the close position or the open position. Therefore, based on whether the output level is H or not, whether the shutter 96' is normally located at the close position or not can be judged.

In addition, steps S14 and S15, which are similar S6 and S7 of FIG. 7, are inserted between S13 and S16A. After the solenoid 95 is driven to move the shutter 96' from the open position to the close position (S13), the ASIC 100 judges whether the sensor output level temporarily drops (S14). If the sensor output level does not temporarily drop (S14: NO), the ASIC 100 determines the malfunction of the shutter 96', i.e., the shutter 96' is stays at the open position although driven to move to the close position. In such a case, an error handling process similar to that in S3 of FIG. 7 is executed in S15. If the ASIC 100 detects that the sensor output level temporarily drops (S14: YES), the process proceeds to S16A.

As described above, in this modification, since the shutter 96' is provided with the reflecting members having different reflectivity (e.g., the first reflecting member 96a' having high reflectivity and the second reflecting member 96b' having low reflectivity) on the portion facing the photo-transistor 91 and the sensor LED 93, the ASIC 100 can distinctly detect the malfunction of the shutter 96' and the presence or absence of the sheet feed belt 33.

In the exemplary embodiment and modification, the color registration sensor is used for detecting the status of the shutter and the absence/presence of the sheet feed belt. It should be noted that a so-called concentration sensor for detecting color density of the marks formed on the sheet feed belt 33 or a sensor other than the color registration sensor may be used. However, the registration sensor 90 is advantageous because of its response in detecting the change of the intensity of the received light in comparison with the concentration sensor. With use of the color registration sensor, even an instantaneous change of the intensity of the reflected light can be detected, and thus, the ASIC 100 can distinctly detect the malfunction of the shutter 96' and the presence or absence of the sheet feed belt 33 reliably. Although the solenoid 95 is used for moving the shutter 96 or 96' in the exemplary embodiment and its modification, a motor may be used alternatively.

In the exemplary embodiment and modification, the invention is applied to the color laser beam printer of the direct tandem type. However, the invention needs not be limited to such configurations, and may be applied to an electrophotographic image forming device utilizing a so-called four cycles system. In the exemplary embodiment and modification, the registration marks are formed on the sheet feed belt 33. However, the invention needs not be limited to such a configuration, and may be applied to an image forming device in which the registration marks are formed on another conveying member (e.g., an intermediate transcriptional body or a photoconductor drum) which is rotated or moved in association with the image forming operation of the image forming unit 10.

What is claimed is:

1. An image forming device configured to form an image on a print sheet, comprising:
   a conveying member configured to convey the print sheet;
   a light source configured to irradiate light toward the conveying member;
   a photo-sensor configured to detect light irradiated from the light source and reflected by the conveying member;
   a shutter member configured to be movably disposed between a close position at which the shutter member shields the light irradiated from the light source and directed toward the conveying member, and an open position at which the shutter member does not shield the light directed from the light source toward the conveying member, the light incident on the conveying member being reflected and directed to the photo-sensor;
   a shutter driving unit configured to move the shutter member between the close position and the open position;
   a reflecting member provided on a photo-sensor side of the shutter member, the reflecting member being configured to reflect light emitted by the light source when the shutter member entirely or partially shields the light emitted by the light source, an intensity of light reflected by the reflecting member and detected by the photo-sensor varying depending on a position of the shutter member, wherein the reflecting member comprises a first reflecting member and a second reflecting member, the first reflecting member having a reflectivity that is greater than or less than the reflectivity of the second reflecting member; and
   a judging member configured to judge (1) whether the shutter member is located at the close position or the open position based on variation of the intensity of the light detected by the photo-sensor when the shutter member is being driven to move by the shutter driving unit, and (2) whether the conveying member is present or absent based on the intensity of the light detected by the photo-sensor when the judging member judges that the shutter member is located at the open position, wherein the judging member is further configured to judge that the shutter member is moving from the close position to the open position if a signal from the photo-sensor changes from a value corresponding to the reflectivity of the first reflecting member to a value corresponding to the reflectivity of the second reflecting member, and to judge that the shutter member is not moving from the close position to the open position if a signal from the photo-sensor does not change from a value corresponding to the reflectivity of the first reflecting member to a value corresponding to the reflectivity of the second reflecting member.

2. The image forming device according to claim 1, wherein the first reflecting member and the second reflecting member are closely aligned in the direction the shutter member moves such that, when the shutter member moves from the close position to the open position, the light emitted by the light source is firstly incident on the first reflecting member and then incident on the second reflecting member.

3. The image forming device according to claim 2, wherein the first reflectivity is greater than the second reflectivity.

4. The image forming device according to claim 1, wherein the shutter driving member is configured such that the distance between the shutter member and the photo-sensor varies when the shutter member is driven to move between the close position and the open position, and wherein the reflecting member is moved so that the intensity of the light detected by the photo-sensor varies corresponding to the distance between the shutter member and the photo-sensor.

5. The image forming device according to claim 4, wherein the conveying member conveys developer on a part of a surface of the conveying member, and
wherein the photo-sensor detects a mark, which is formed on the part of the surface of the conveying member with the developer, used for examining a position of the image to be formed on the print sheet.

6. The image forming device according to claim 4, further comprising an aperture plate formed with a first aperture and a second aperture, the first aperture being located between the light source and the shutter member and the second aperture being located between the photo-sensor and the shutter member when the shutter member is located at the close position,
wherein the first aperture and the second aperture are arranged such that the light emitted by the light source is incident on the reflecting member through the first aperture and the light reflected by the reflecting member is not incident on the photo-sensor through the second aperture when the shutter member is located at the close position, and that the light emitted by the light source is incident on the conveying member through the first aperture and the light reflected by the conveying member is incident on the photo-sensor through the second aperture when the shutter member is located at the open position.

7. The image forming device according to claim 1, wherein the conveying member conveys developer on a part of a surface of the conveying member, and
wherein the photo-sensor detects a mark, which is formed on the part of the surface of the conveying member with the developer, used for examining a position of the image to be formed on the print sheet.

8. The image forming device according to claim 1, further comprising an aperture plate formed with a first aperture and a second aperture, the first aperture being located between the light source and the shutter member and the second aperture being located between the photo-sensor and the shutter member when the shutter member is located at the close position,
wherein the first aperture and the second aperture are arranged such that the light emitted by the light source is incident on the reflecting member through the first aperture and the light reflected by the reflecting member is not incident on the photo-sensor through the second aperture when the shutter member is located at the close position, and that the light emitted by the light source is incident on the conveying member through the first aperture and the light reflected by the conveying member is incident on the photo-sensor through the second aperture when the shutter member is located at the open position.

9. An image forming device configured to form an image on a sheet, comprising:
a conveying member configured to convey the sheet;
a light source configured to irradiate light;
a photo-sensor configured to detect light and output a signal according to an intensity of the detected light;
a shutter member comprising:
    a first reflecting member having a first reflectivity on a side facing the photo-sensor, and
    a second reflecting member having a second reflectivity on the side facing the photo-sensor;
a shutter driving unit configured to move the shutter member from a close position, in which the light from the light source is reflected by the first reflecting member toward the photo sensor, to an open position, in which the light from the light source is reflected by the conveying member toward the photo sensor, via a mid-course position, in which the light from the light source is reflected by the second reflecting member toward the photo sensor; and
a controller coupled to the photo-sensor and the shutter driving unit, configured to:
    drive the shutter driving unit to move the shutter member from the close position to the open position via the mid-course position,
    judge that the shield member is moving if the signal from the photo sensor changes from a value corresponding to the first reflectivity to a value corresponding to the second reflectivity, and
    judge that the shield member is not moving if the signal from the photo sensor does not change from a value corresponding to the first reflectivity to a value corresponding to the second reflecting ratio.

10. An image forming device configured to form an image on a print sheet, comprising:
a conveying member configured to convey the print sheet;
a light source configured to irradiate light toward the conveying member;
a photo-sensor configured to detect light irradiated from the light source and reflected by the conveying member;

a shutter member configured to be movably disposed between a close position at which the shutter member shields the light irradiated from the light source and directed toward the conveying member, and an open position at which the shutter member does not shield the light directed from the light source toward the conveying member, the light incident on the conveying member being reflected and directed to the photo-sensor;

a shutter driving unit configured to move the shutter member between the close position and the open position;

a reflecting member provided on a photo-sensor side of the shutter member, the reflecting member being configured to reflect light emitted by the light source when the shutter member entirely or partially shields the light emitted by the light source, an intensity of light reflected by the reflecting member and detected by the photo-sensor varying depending on a position of the shutter member; and a judging member configured to judge: (1) whether the shutter member is disposed at the close position or the open position based on variation of the intensity of the light detected by the photo-sensor when the shutter member is being driven to move by the shutter driving unit, and (2) whether the conveying member is present or absent based on the intensity of the light detected by the photo-sensor when the judging member judges that the shutter member is disposed at the open position, wherein the reflecting member comprises a first surface having a first reflectivity and a second surface having a second reflectivity that is greater than or less than the first reflectivity, the first surface and the second surface being closely aligned in the direction the shutter member moves such that, when the shutter member moves from the close position to the open position, the light emitted by the light source is firstly incident on the first surface and then incident on the second surface.

\* \* \* \* \*